Feb. 16, 1943.   H. P. WICKHAM ET AL   2,311,144
APPARATUS FOR HYDROCARBON ALKYLATION
Filed Jan. 29, 1941

HENRY P. WICKHAM
MYRLE M. PERKINS
INVENTORS

BY E. F. Lietrecht

ATTORNEY

Patented Feb. 16, 1943

2,311,144

UNITED STATES PATENT OFFICE 2,311,144

APPARATUS FOR HYDROCARBON ALKYLATION

Henry P. Wickham, Glen Head, and Myrle M. Perkins, Brooklyn, N. Y., assignors to The M. W. Kellogg Company, New York, N. Y., a corporation of Delaware Application January 29, 1941, Serial No. 376,466

4 Claims. (Cl. 196—46)

This invention relates to hydrocarbon alkylation and particularly to alkylation of iso-paraffinic hydrocarbons with olefinic hydrocarbons in the presence of a liquid catalyst such as sulphuric acid. More particularly our invention relates to apparatus for carrying out an alkylation reaction of the latter type.

Successful operation of a liquid-catalyzed alkylation process hinges upon obtaining intimate contact between the catalyst and the hydrocarbons to be alkylated. The formation of an emulsion of the two is the preferred method of insuring such contact. It is also desirable, however, that alkylate shall be separated from the catalyst as soon as possible after it has been formed, so that the catalyst may have a greater opportunity to contact additional unreacted hydrocarbons.

One of the objects of our invention is to provide an improved apparatus for iso-paraffin-olefin alkylation which will facilitate the separation of alkylate from catalyst liquid.

Another object of our invention is to provide an alkylation apparatus which will be cheaper to construct and simpler to operate than prior known equipment. Other objects will be apparent during the course of the following description, in which reference will be made to the annexed drawing.

Figure 1:
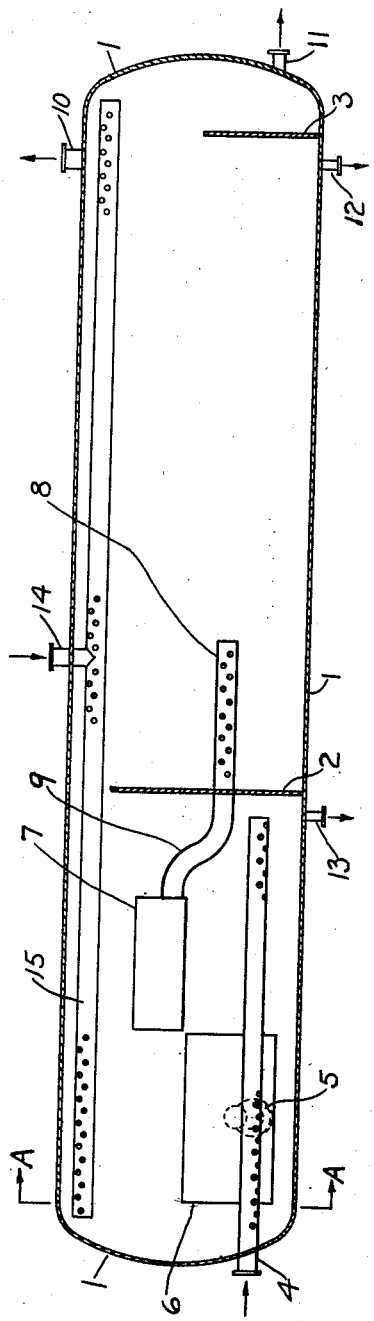
Figure 2:
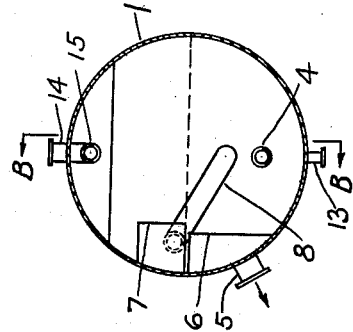
Figure 3:
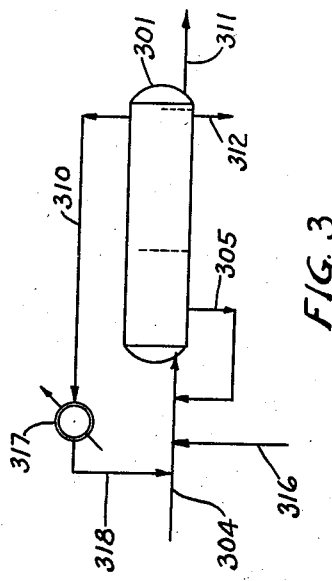

In the drawing, Figure 1 shows a preferred form of the apparatus of our invention in sectional elevation, along a line "B—B" shown in Figure 2, and Figure 2 is a cross-sectional view of the apparatus of Figure 1 taken along a line "A—A" shown in the latter figure, and Figure 3 is a diagrammatic flow sheet showing the paths of streams flowing into and out of the apparatus of Figures 1 and 2 in accordance with a preferred mode of operation thereof.

In Figures 1 and 2, the numeral 1 designates a relatively elongated horizontal cylindrical vessel, closed at both ends. Partition 2 is placed perpendicularly across the long axis of the vessel and is in the form of a circle from which a zone (geometrically defined) has been cut off. The straight side produced by the removal of the zone from the circular partition is placed at the top so that there is an open space affording communication between the two sides of the partition. A second and similar partition 3, somewhat lower in height, is located adjacent the right end of the vessel.

Into the lower portion of the space between partition 2 and the left end of the vessel projects a perforated pipe 4 which is provided with an exterior nozzle whereby liquids may be injected into the vessel and caused to issue through the perforations in the form of a multiplicity of jets. An exit connection 5 for liquid is located part way up the side wall of the vessel. Access to the outlet 5 is by overflow across the top of a horizontal weir 6 which is affixed to the interior wall of the vessel and which has closed ends so as to define an open top box about the entrance to the outlet connection 5. Higher up on the same interior side wall of vessel 1 is located an additional weir box 7 which, however, is not provided with any outlet from the vessel. A transferring conduit 9 connects to one of the ends of weir box 7 and passes longitudinally of vessel 1 to and through the partition 2, connecting thereat to a perforated distribution pipe 8 which projects into the space lying between partitions 2 and 3.

Outlet 10 is located on the top side of the vessel and outlet 11 is located in the right hand end so as to withdraw from the space between that end and partition 3. Draw-off connection 12 is located on the bottom side of the vessel between partitions 2 and 3. Outlet 13 is located in the bottom of the vessel to the left of partition 2 and inlet 14 is located in the top of the vessel. The latter projects through the wall of the vessel and connects with longitudinally extending perforated pipe 15 lying close along the upper interior surface of the vessel.

The manner in which this preferred form of our apparatus is to be employed in carrying out an alkylation reaction will now be described with reference to Figures 1, 2 and 3, the flow lines in Figure 3 all being connected to vessel 301 in that figure at points the exact locations of which appear in Figures 1 and 2.

In Figure 3 a mixture of iso-paraffinic and olefinic hydrocarbons to be alkylated is passed through line 304 at a suitable alkylation temperature, for example between 30° and 70° F. A liquid alkylation catalyst such as 96% sulphuric acid is introduced into the hydrocarbons flowing through line 304 by means of line 316. The resultant mixture continues through line 304 and enters vessel 301 by way of pipe 4 shown in Figures 1 and 2.

In issuing through the perforations in pipe 4 the acid-hydrocarbon mixture is subjected to high shearing stress, the number and size of the perforations being such that a multiplicity of high velocity liquid jets are formed. The shearing stress and the turbulence produced by the jets are effective to emulsify the acid with the hydrocarbons. Emulsion thus formed is accumulated in the space between the left end of the vessel and partition 2. Alkylation of the iso-paraffins with the olefins will commence immediately upon formation of an emulsion, the emulsified condition of the reactants being maintained by the continuous injection of additional quantities of hydrocarbons and catalyst. As additional quantities of material continue to be added emulsion is accumulated in the reservoir until it reaches the level of the weir box 6 in Figures 1 and 2 whereupon it overflows into the outlet connection 5 and is withdrawn. In order that more agitation may be obtained in the alkylation zone than would be produced by the injection of fresh feed hydrocarbons alone, emulsion is withdrawn through outlet connection 5 of Figures 1 and 2, passed through line 305 of Figure 3 and introduced into feed line 304 for reinjection into the alkylation zone. By varying the amount of emulsion thus recirculated it is possible to produce any degree of agitation desired and to prevent the emulsion from breaking down prematurely. After this recycling procedure has been established, the amount of acid mixed with the fresh feed prior to injection of the latter with the recycled emulsion is only that necessary to maintain the strength of the recirculated acid at the desired point.

As alkylation commences exothermic heat is liberated and must be removed in order to maintain a proper alkylation temperature. To this end a pressure is maintained on the reacting mixture such that vaporization of hydrocarbons will occur at the chosen alkylation temperature. The exothermic heat of the alkylation reaction may thereby be removed in the form of latent heat of evaporation. The evolved vapors pass from vessel 301 (through connection 10 of Figures 1 and 2) into line 310. Continuing through this line the vapors traverse a suitable cooling device such as water cooled condenser 317 where they are returned to the liquid state. The thus produced condensate goes through line 318 and joins the incoming fresh feed stream in line 304. By this means we return the vapors evolved in cooling the reaction to the alkylation zone so that no loss is suffered. It will be understood that compression of the vapors traversing line 310 will usually be necessary in order that condensation may occur at cooling water temperature. No compressor is shown in the drawing, as conventional equipment not directly causing a change of state has been omitted for greater simplicity.

We have found that when a body of emulsified hydrocarbons is established in a liquid reservoir as described, the extent of agitation decreases and hence opportunity for the emulsion to break down increases with the distance from the jets which produce the agitation. Therefore, by making the liquid reservoir wherein the reactants are held sufficiently deep and by placing the emulsifying jets at the bottom, we are able to use the upper part of the reservoir as a demulsifying zone. As alkylation proceeds in the reservoir and as additional reactants are added and recirculation is continued the level of the liquid in the reservoir will continue to rise and its upper portion will become relatively quiescent. In this portion the components of the emulsion tend to separate with the formation of an upper layer relatively rich in hydrocarbons. When the liquid level reaches the lip of the weir box 7 shown in Figures 1 and 2 the hydrocarbon-rich layer will be skimmed off continuously and will flow through line 9 into line 8 and finally into the space between partitions 2 and 3. The perforations in line 8 are effective to release liquid at a multiplicity of points and at a low velocity.

The degree of agitation provided in the alkylation zone and the horizontal cross-sectional area thereof determine the degree of emulsification which will exist at any given liquid level therein, and the proportion which the volume of liquid in the alkylation zone bears to the rate at which the feed is introduced determines the average length of time hydrocarbons will be in contact with the catalyst before settling upwardly far enough to be skimmed off. In accordance with our invention we so proportion the degree of agitation, the depth and cross-sectional area of the alkylation zone and the feed rate as to obtain a time of residence of hydrocarbons therein which will insure substantially complete reaction of the olefin hydrocarbons in the feed—there being preferably an excess of iso-paraffin hydrocarbons in the feed over and above that proportion stoichiometrically equivalent to the olefin hydrocarbons.

The liquid skimmed off by weir box 7 will be relatively low in acid content and while it traverses the space to the right of partition 2 in a state of relative quiescence an opportunity is given for the last traces of acid to settle out. As liquid accumulates in this space it will eventually reach the top of partition 3, whereupon continuous overflow and withdrawal via connection 11 and line 311 takes place. Withdrawal of sedimented acid from the bottom of the settling zone is by means of outlet 12 through line 312. By proper adjustment of the degree of agitation in the alkylation zone the acid carried over into the settling space may be made substantially equal to the quantity of fresh acid introduced via line 316—the equivalence of the two quantities being fixed by the displacement effect of the fresh acid. In this manner the tendency of the catalyst to become less active on account of the gradual solution therein of organic compounds, traces of water in the feed, etc. is counteracted. If greater amounts of catalyst carry over into the settling zone no great harm is done, as a portion thereof may be returned to the alkylation zone in any suitable manner, such as by introduction into line 304.

As is true of all industrial equipment, it will be necessary to discontinue the operation of our process occasionally for purposes of repair, inspection and cleaning. This will of course necessitate draining the reactor-settler vessel and removing all acid therefrom in order that personnel may enter in safety. It is a peculiar characteristic of sulphuric acid that it is relatively non-corrosive to iron and steel in high concentrations, but is highly corrosive when somewhat diluted. Complete removal of acid from our apparatus is most conveniently achieved by water washing, but unless this takes place very rapidly, severe corrosion of the metal shell and parts may occur. We therefore provide a perforated water spray distributor 15 (Figures 1 and 2) connected to the inlet 14, by which all parts of the interior of the vessel may be instantly flushed with an abundance of water. The extremely dilute acid thus produced is not severly corrosive and is quickly withdrawn through the drain connection 13 and outlet 12.

In order to facilitate complete understanding of our invention, a specific example thereof will now be described. It was desired to alkylate approximately 40 mols per hour of butylene with iso-butane, and to this end a feed stock having the following components was made up:

| Component: | Mols per hour |
|---|---|
| Propane | 40 |
| Iso-butane | 400 |
| Butylene | 40 |
| Normal butane | 330 |
| Total | 810 |

The propane and normal butane were present merely as diluents, solely because of the difficulty of separating them from the actual reactant materials. It will be seen that the ratio of isobutane to butylene is 10:1.

The catalyst employed was 98% sulphuric acid and the reaction time necessary for complete alkylation of the butylene was known to be approximately 15 minutes.

The embodiment of our invention used to carry out the operation was as shown in Figures 1 and 2. The length of the shell 1 was approximately 45 feet and its diameter was 10 feet. The partition 2 extended to a height of 8 feet above the bottom of the vessel, and was spaced 17 feet from the left end. The lip of the weir box 6 was placed 5 feet above the bottom of the vessel, and the lip of weir box 7 was placed at a height of 7 feet. Partition 3 was located about 1 foot from the right end of the vessel and had a height of 5 feet.

The injection line 4 was 12 inches in diameter and was provided with approximately 150 jets. Vapor outlet nozzle 10 was 8 inches in diameter and the flushing connection 14 was 6 inches in diameter.

In the operation, addition of fresh acid with the feed at the rate of 74 gallons per hour was necessary to maintain satisfactory conversion. Withdrawal and recirculation of emulsion was at approximately fifteen times the volumetric rate at which the fresh feed was introduced, and this rate of recirculation maintained a body of emulsion in the reaction reservoir which contained the equivalent of about fifteen minutes' supply of feed, thus insuring the desired reaction time.

A pressure between about 16 and 20 pounds absolute was maintained on the vessel, which, due to the composition of the feed, set the reaction temperature at approximately 35° F. About 20,000 pounds of hydrocarbons per hour were vaporized at system pressure in maintaining the above temperature, and the vapors were compressed to 75 pounds per square inch and condensed at cooling water temperature; the condensate was recycled as shown in Figure 3.

The quantity of acid carried over into the settling space at the right of partition 2 was approximately equal in volume to the fresh acid introduced, and the total time for acid settling was approximately 1.5 hours.

The quantity of alkylate produced, in mols per hour, was the same as the quantity of butylene introduced, as one mol of butylene combined with one mol of iso-butane to produce one mol of alkylate.

It will be understood that the apparatus and method of operation described may be modified in various ways within the scope of our invention. For instance, it is possible to maintain a suitable reaction temperature by refrigerating the emulsion in the reservoir by indirect contact with an evaporating refrigerant, or the recirculated emulsion may be passed in heat exchanging relationship with a refrigerant before it is reintroduced into the reservoir. Our invention is not limited by any of the exemplary forms thereof shown and described, but only by the following claims, in which we wish to claim all novel features of our invention.

We claim:

1. An apparatus for effecting hydrocarbon alkylation in the presence of a sulphuric acid catalyst which comprises a closed vessel partitioned into at least two liquid compartments, an inlet connection terminating inside and near the bottom of one of said compartments in a plurality of constricted openings adapted to emulsify liquid mixtures introduced therethrough, an emulsion outlet connection accessible from said compartment only at a higher level than that at which said inlet connection terminates, a hydrocarbon outlet connection accessible from said compartment only at an appreciably higher level than at which said emulsion outlet connection is accessible, a conduit leading from said hydrocarbon outlet connection into a second compartment of said vessel, a connection for withdrawing hydrocarbons from said second compartment which is accessible only at a level appreciably above the bottom thereof, and a connection for withdrawing catalyst liquid from the bottom of said second compartment.

2. An apparatus as in claim 1 including means for withdrawing hydrocarbon vapors from the upper portions of said compartments.

3. An apparatus for effecting the alkylation of iso-paraffinic hydrocarbons with olefinic hydrocarbons in the presence of a sulphuric acid catalyst comprising a first container for liquids, means for introducing liquid hydrocarbons and a catalyst liquid into said first container, means adjacent the bottom of said container for emulsifying thus-introduced liquids, upper means for withdrawing liquid from said first container at a point appreciably above said emulsifying means, a second container for liquids, means for transferring thus-withdrawn liquid to said second container, means for releasing thus-transferred liquid in said second container at a low velocity, lower means for withdrawing emulsion from said first container at a point intermediate said emulsifying means and said upper withdrawing means, means for reintroducing thus-withdrawn emulsion into the bottom of said first container and resubjecting it to the action of said emulsifying means, means for withdrawing liquid hydrocarbons from said second container at a point appreciably above the bottom thereof, and means for withdrawing catalyst liquid from the bottom of said second container.

4. An apparatus for effecting hydrocarbon alkylation in the presence of a sulfuric acid catalyst which comprises a closed vessel partitioned into at least two liquid compartments, an inlet connection terminating inside and near the bottom of one of said compartments in a plurality of constricted openings, an emulsion outlet connection accessible from said compartment only at a higher level than that at which said inlet connection terminates, a liquid outlet accessible from said compartment only at a higher level than that at which said emulsion outlet connection is accessible and adapted to transfer liquids thus withdrawn into a second compartment at a relatively low velocity, an outlet for withdrawing hydrocarbons from said second compartment which is accessible from said second compartment only at a level appreciably above the bottom thereof, and a connection for withdrawing liquid from the bottom of said second compartment.

HENRY P. WICKHAM.
MYRLE M. PERKINS.